Nov. 20, 1934.  H. HUEBER ET AL  1,981,841
FUEL SYSTEM FOR MOTOR VEHICLE ENGINES
Filed Feb. 11, 1932  4 Sheets-Sheet 1
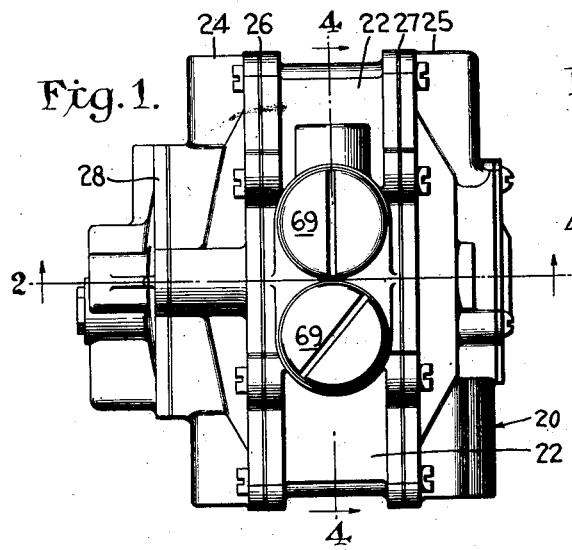
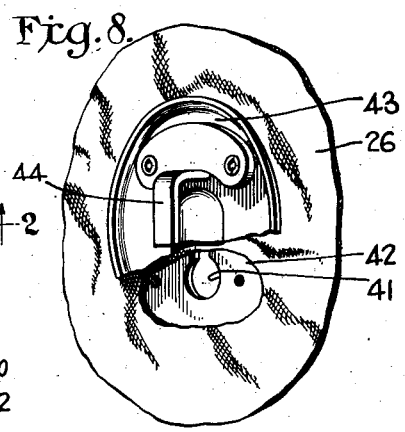
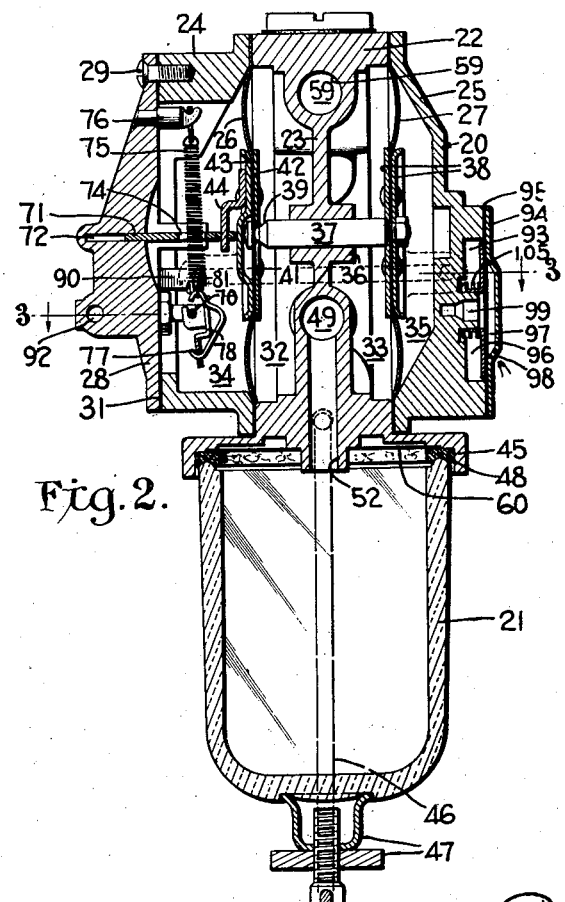
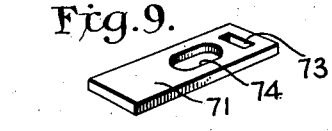
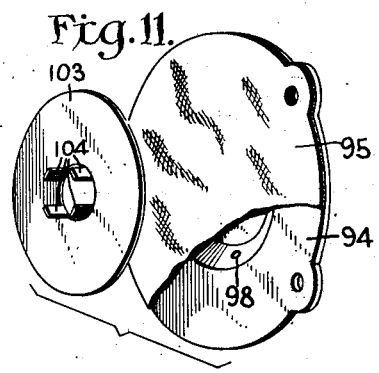
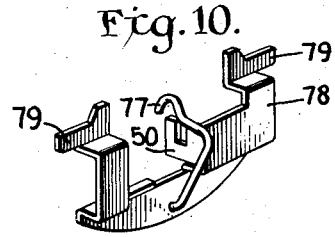
INVENTORS
Henry Hueber,
Erwin C. Horton.
BY Bean & Brooks, ATTORNEYS Nov. 20, 1934.  H. HUEBER ET AL  1,981,841
FUEL SYSTEM FOR MOTOR VEHICLE ENGINES
Filed Feb. 11, 1932  4 Sheets-Sheet 2
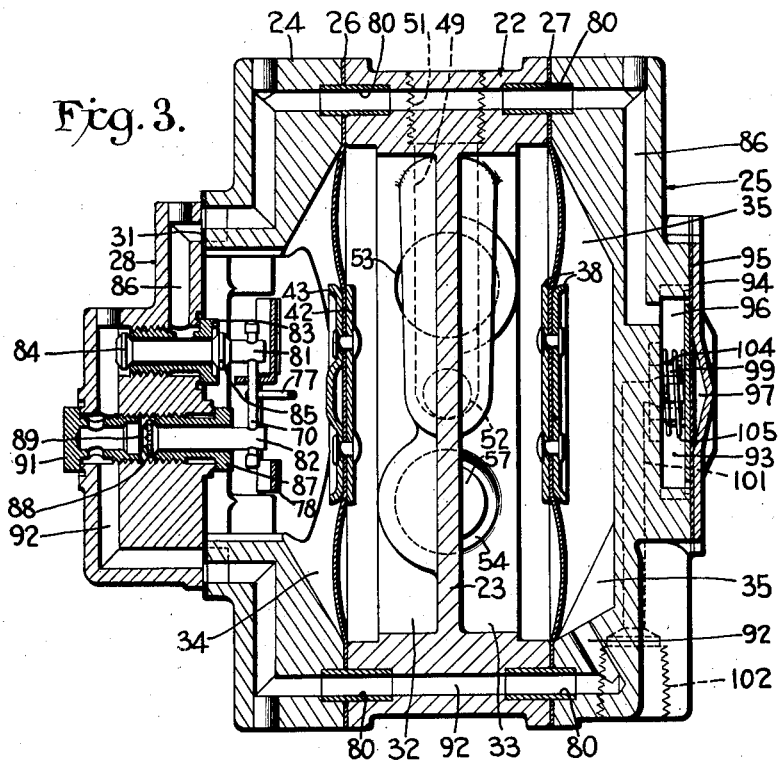
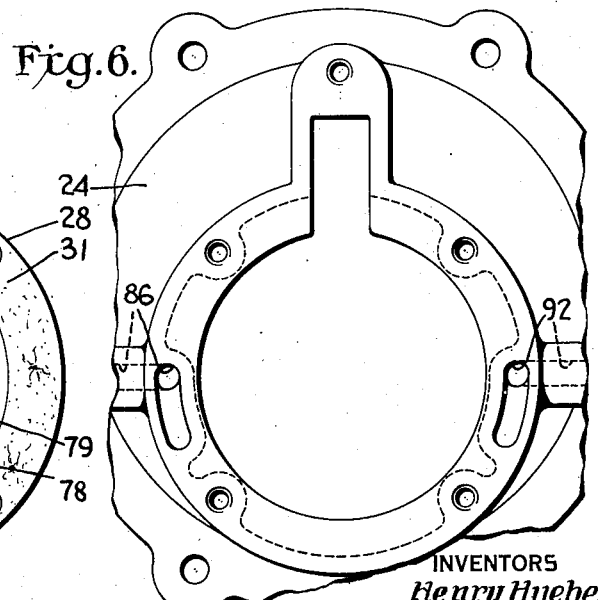
INVENTORS
*Henry Hueber,*
*Erwin C. Horton.*
BY
*Bean & Brooks,* ATTORNEYS Nov. 20, 1934.   H. HUEBER ET AL   1,981,841
FUEL SYSTEM FOR MOTOR VEHICLE ENGINES
Filed Feb. 11, 1932   4 Sheets-Sheet 3
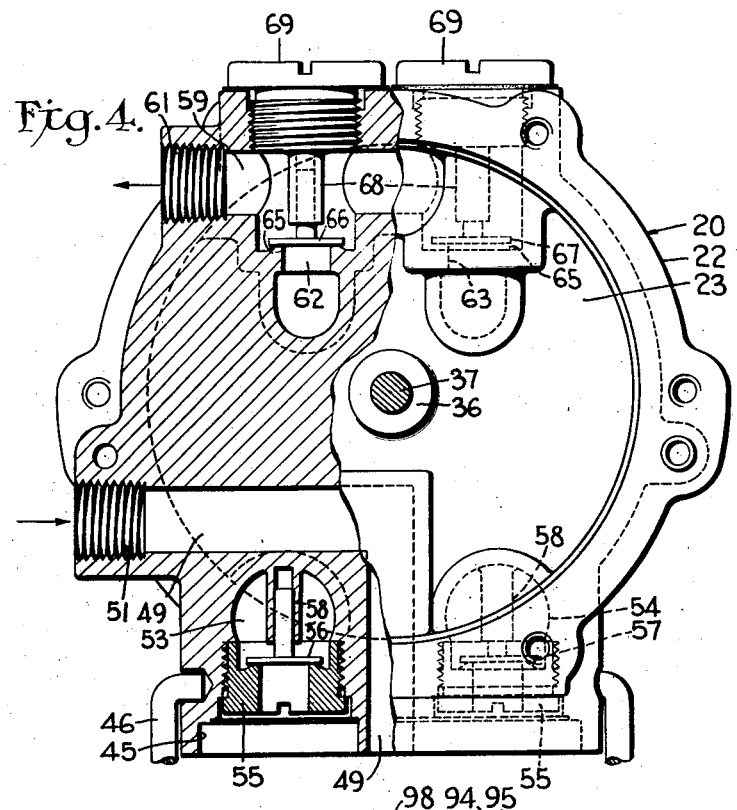
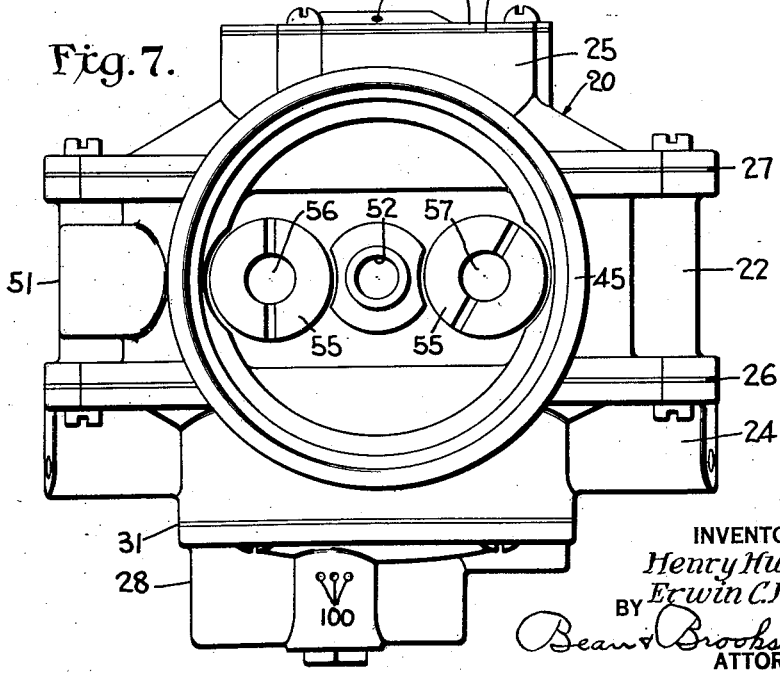
INVENTORS
Henry Hueber,
Erwin C. Horton,
BY Bean & Brooks
ATTORNEYS

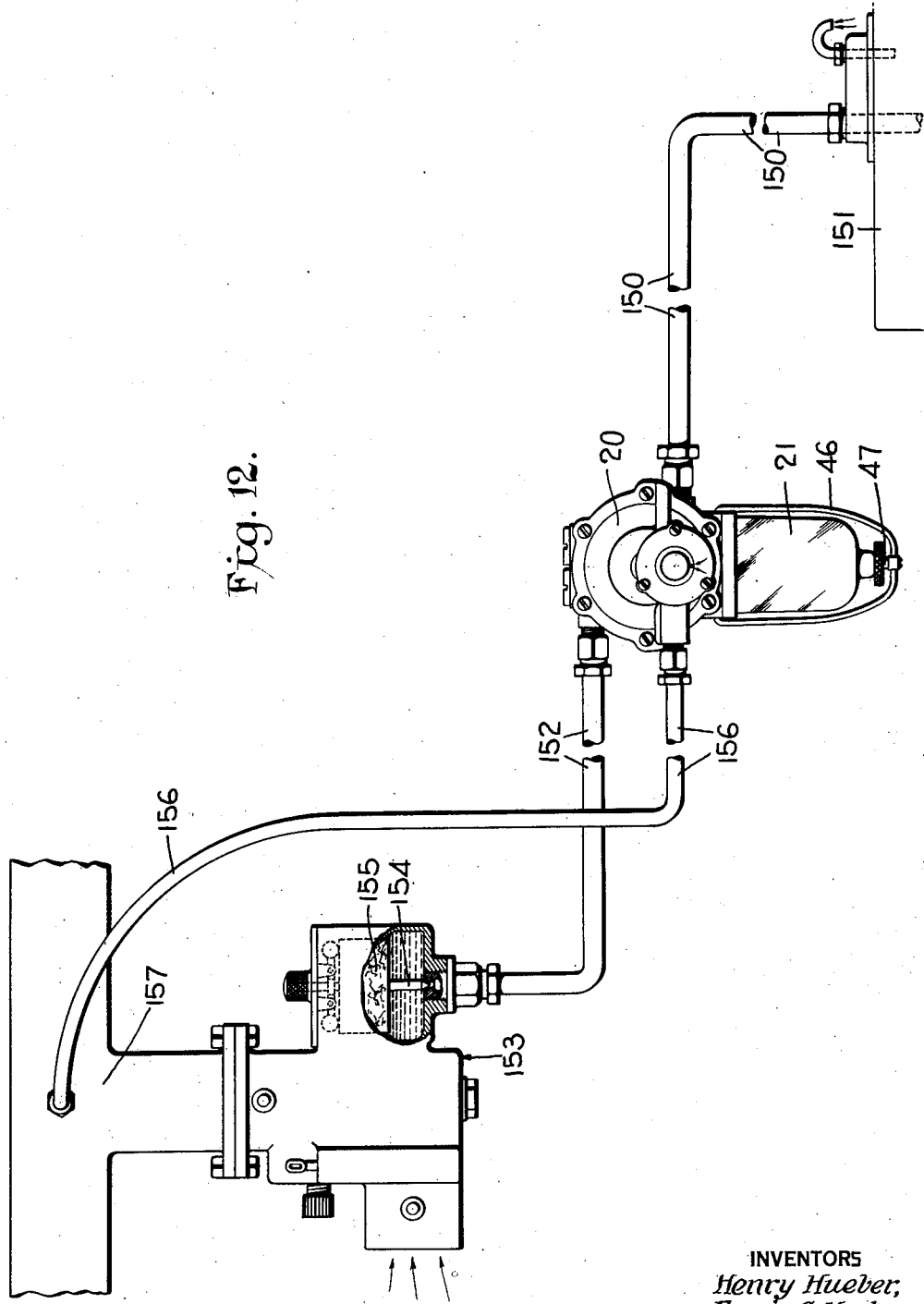

Patented Nov. 20, 1934

1,981,841

UNITED STATES PATENT OFFICE 1,981,841

FUEL SYSTEM FOR MOTOR VEHICLE ENGINES

Henry Hueber, Buffalo, and Erwin C. Horton, Hamburg, N. Y., assignors to Trico Products Corporation, Buffalo, N. Y.

Application February 11, 1932, Serial No. 592,423

17 Claims. (Cl. 103—153)

This invention relates to a fuel system for motor vehicle engines and particularly to one operable by suction for pumping fuel from fuel reservoirs to the carburetors, or the like.

Because of the varying loads to which such engines are subjected, particularly when they are used to power automotive vehicles, boats, and the like, their fuel consumption varies materially, so that an adequate supply of fuel at peak load will be excessive when the engine is under light load. Heretofore mechanical and suction operated pumps have been proposed for supplying the fuel to the carburetor, the latter class of devices being operated by suction maintaining in the intake manifolds of the engines. The degree of such suction is subject to variation, with the result that in certain types of suction operated fuel pumps, having capacity to provide sufficient fuel when the engine load is peak, and the throttle open, so that the degree of suction is below maximum, an excessive amount of fuel will be pumped when the engine is under light load with partially closed throttle. This, it has been found, will sometimes create such excessive pressure in the fuel line that the float valve, or other carburetor fuel inlet control means, will be unseated and the carburetor flooded.

The present invention comprehends an improved fuel system which will operate efficiently under a variable engine suction and in a manner to meet the demand of the engine as made upon the system.

The invention further comprehends an improved device operable by suction, complete in a single unit, which will provide an adequate but not excessive supply of fuel under various engine operating conditions, means being provided in the unit to limit the degree of suction applied to the actuating parts of the pump. Because of its unitary construction, the device may be readily mounted at any point in the fuel line between the engine carburetor and fuel tank, and may be placed remote from the engine, thereby eliminating "vapor lock", caused by vaporization of fuel under low pressure in the fuel line by engine heat.

These and other objects and advantages, including those arising from the arrangement of the valve mechanism and other parts of the device, which render it economical of manufacture and efficient in use, will become apparent from the following description of one typical embodiment of the invention, reference being made to the accompanying drawings, wherein:—

Fig. 1 is a plan view of the complete fuel pumping unit employed in the improved fuel system.

Fig. 2 is a vertical sectional view taken along line 2—2 of Fig. 1.

Fig. 3 is a horizontal section taken along broken line 3—3 of Fig. 2.

Fig. 4 is a vertical sectional view at right angles to that of Fig. 2 and taken along line 4—4 of Fig. 1.

Fig. 5 is an elevation of the casing section which supports the suction valve mechanism, the section being illustrated as detached from the other casing parts.

Fig. 6 is an elevation of the casing section which attaches the suction valve supporting casing, the latter being removed.

Fig. 7 is a bottom plan view of the pump casing with the fuel reservoir removed therefrom.

Fig. 8 is a central fragmentary view of the pump diaphragm adjacent the valve mechanism depicting a finger on the diaphragm for engaging a valve actuating slide.

Fig. 9 is a perspective of the valve actuating slide.

Fig. 10 is a perspective view of a valve rock member.

Fig. 11 is a perspective showing a suction control diaphragm and a reinforcing plate therefore in disassembled relation.

Fig. 12 is a side elevation of the pump device connected to the fuel reservoir, the engine carburetor and the intake manifold of the improved fuel system.

As shown in the drawings, the unit comprises a single casing 20 supporting a removable fuel jar 21, preferably formed of transparent material such as glass. Casing 20 includes an intermediate section 22, having a substantially vertical central wall 23, and end sections 24 and 25 secured thereto, a pair of flexible diaphragm pistons 26 and 27 being secured between the intermediate and end sections. A casing closure section 28, supporting valve mechanism, is secured to the end section 24 by fasteners 29, a gasket 31 being interposed between the sections. The casing interior is thus divided into a plurality of chambers, two being fuel pumping chambers 32 and 33, between the wall 23 and the diaphragms 26 and 27, respectively, and two being suction or actuating chambers 34 and 35, between the diaphragms and the end walls of the casing.

The central casing has a central bearing portion 36 slidably receiving a shank 37, one end of which carries a pair of discs 38 secured to the diaphragm 27, and the opposite end of which is recessed at 39 for engaging a keyhole slot 41 of disc 42 on one side of the diaphragm 26. A disc 43, on the opposite side of diaphragm 26, and secured to the diaphragm and to disc 42, carries a finger 44. As shown in Figs. 2 and 4, the central casing section has a flanged lower end 45 for receiving the upper and open end of fuel jar 21. A bail 46, engaged with the casing, and clamping means 47 serve to retain the jar compressed against a gasket 48 seated in flange 45. A fuel inlet passage 49 in section 22 has one end 51 adapted for connection to a fuel line 150 extending to a fuel reservoir 151 and terminates in an opening 52 discharging into the jar 21. The central casing section has a pair of openings 53 and 54 extending from the fuel jar into chambers 32 and 33 respectively. Valve seating members 55 are threaded into the lower ends of these openings for seating valves 56 and 57, the stems of which are guided in valve guides 58. A screen 60 for filtering foreign matter from the fuel is disposed beneath the passages 53 and 54.

At the top of the central casing section 22 is a fuel discharge passage 59 having one end, 61, adapted for connection to a fuel line 152 extending to the engine carburetor 153 which may have means, such as valve 154 controlled by float 155, for admitting only such quantities of fuel as the engine may require. A pair of valved passages 62 and 63 connect the chambers 34 and 35 with the passage 59. Annular seats 65 are provided in the valve passages for seating valves 66 and 67, respectively, the stems of which are supported in valve guides 68. The latter may be extensions of plugs 69 which are threaded into the upper wall of casing section 22.

The valve mechanism for the suction chambers 34 and 35 includes a slide 71, shown in Fig. 9, movable in a direction axial of rod 37 in a guideway 72 formed in the closure section 28. The slide has an opening 73, for receiving the finger 44 which is connected to the diaphragms, and the slide having an elongated aperture 74 for passing a valve spring 75, the upper end of which is anchored to a pin 76 carried by the closure section. The other end of the spring is attached to a wire bail 77, the lower end of which engages a bottom portion of a valve rock member 78, shown in Fig. 10. At the top of the rock member are a pair of laterally extending trunnions 79 seated for angular movement on a horizontal axis in notches formed in supporting protuberances 90 on the closure section 28, the rock member being retained engaged with the protuberances by the spring 75.

Ear 50, struck out from the rock plate member 78, is notched to receive a bar 70 connected to and extending between valve stems 81 and 82. Valve stem 81 extends through a valve seat bushing 83, threaded to closure section 28, and carries two valves 84 and 85 adapted to seat respectively against the outer and inner faces of the seat bushing. The latter has an opening between the valves in communication with a suction passage 86 extending through casing sections 28, 24, 22 and 25.

Valve stem 82 is guided in a valve seat bushing 87 and has a valve portion 88 adapted to alternately seat against the outer face of bushing 87 and against the inner face 89 of a valve seat plug 91. The latter is hollow and has openings forming a part of a fluid passage 92 extending from valve 84 in casing section 28, through casing sections 24, 22 and 25 into chamber 35. Air vents 100 admit atmospheric pressure into the space between plug 91 and bushing 87. The passages 86 and 92, as shown in Fig. 3, comprise openings in sections 28, 24, 22 and 25 which are in registry. Sleeves 80 extending in the openings into adjacent casing sections prevent leakage at points of registry of the openings.

End casing section 25 has a recess 93 covered by a closure plate 94, as shown in Figs. 2 and 3. A flexible diaphragm 95 disposed between the casing section and plate divides the recess into a pair of chambers 96 and 97, the latter having an atmospheric vent 98, and chamber 96 being in communication with suction passage 86. Centrally of recess 93 is a tubular extension 99, communication with a passage 101 having its outer end 102 adapted for connection to a suction line 156 extending to the intake manifold 157 of an internal combustion engine or other source of less-than-atmospheric pressure. An annular plate 103, shown in Fig. 11, is seated against the diaphragm in chamber 96 and has inwardly extending guide fingers 104 slidably engaged with the tubular extension 99. Spring 105 coiled about the tubular extension, normally retains the diaphragm spaced from the open end of the extension.

In operation, with the valve parts in the position illustrated, suction maintaining in the line 102, will withdraw air from chamber 34, past unseated valve 85, through bushing 83, passage 86, chamber 96, and through passage 101. Since valve 84 is seated and valve 88 is seated against bushing 87, atmospheric air passing into the casing through vents 100 will be excluded from chamber 34 but will pass into chamber 35 through passage 92. Atmospheric pressure being effective in chamber 35 and a partial vacuum maintaining in chamber 34 will cause the diaphragms 26 and 27 and connecting rod 37 to be moved to the left, as the device is shown in Figs. 2 and 3.

This movement will continue until the inner wall of opening 74 in slide 71, which is movable with the diaphragms, engages and shifts the spring 75 past the dead center line, which extends between the spring's upper point of suspension and the pivot axis of trunnions 79 of the rock member 78. The spring will then shift the rock member in a clockwise direction, as the device is viewed in Fig. 2, thereby seating valve 85, unseating valve 84, and moving valve 88 to seat 89. Atmospheric pressure will now become effective in chamber 34, through vents 100 and the bore of bushing 87, while passage 92 and chamber 35 will be closed from communication with the atmosphere. Suction at the source will withdraw air from chamber 35, through passages 92, bore of bushing 83, passage 86, chamber 96, and passage 101. The direction of movement of the diaphragms will accordingly be reversed, and they will move to the right, as the device is shown in Figs. 2 and 3, until the slide 71, moved by the diaphragm pistons, shifts the valve mechanism to the position illustrated, when the cycle of operation just described will be repeated.

As the diaphragms reciprocate the chambers 32 and 33 will be alternately enlarged and ensmalled, with the following action:

When chamber 32 is enlarged, valve 66 will be closed, due to the partial vacuum created in the chamber and the tendency of fluid in passage 59 to recede thereinto, while fluid in the fuel reservoir will be forced by atmospheric pressure through passage 49, opening 52, fuel jar 21, through screen 60 and opening 53 into chamber 32, the movement of the fluid unseating the valve 56. Simultaneously, fuel in chamber 33, which is being contracted, will be forced through passage 63 into passage 59 and to the engine carburetor, valve 57 being seated by the pressure in chamber 33. Upon reversal of the diaphragm movement, valves 56 and 65 will be seated, and valves 57 and 66 opened, fuel will flow through passage 49 into chamber 33, and fuel will be exhausted from chamber 32, through passage 59 to the carburetor.

When the carburetor is filled so that its fuel inlet valve 154 closes, operation of the pump unit will suspend, the suction control means within recess 93 of casing section 25 preventing such excessive pressure being applied to the valve 154 as to force it open. When excessive suction occurs in the passages 86 and 101 and in chamber 96, atmospheric pressure in chamber 97 effective upon the outer face of diaphragm 95 will force the latter inwardly against the resistance of spring 105, thereby closing or partially closing the opening through the tubular extension 99, restricting the flow of fluid between passages 86 and 101, and thus relieving the excessive suction effective against the pumping diaphragms.

As will be apparent from the foregoing description, the pump parts are so arranged that they may be expeditiously assembled, and are readily accessible for inspection or repair. Thus, the diaphragm 27 may be inspected or replaced upon removal of casing section 25, without interfering with other parts of the device. Diaphragm 26 may be inspected or replaced by disconnecting casing sections 22 and 24 without interfering with the valve mechanism, since finger 44 may be readily removed from or replaced in the opening 73 in slide 71. Likewise the suction valve mechanism may be removed as a unit upon disconnecting casing sections 24 and 28, without interfering with the diaphragm assembly, and the valves in the central casing section 22 may be made accessible without removal of any casing section.

The system will furnish an adequate supply of fuel to the engine only in such quantity as the demand requires, without undue strain on any parts and without the danger incident to an overflow caused by a supply in excess to the engine requirements.

It will be understood that the detailed structure herein described and illustrated is merely illustrative of the inventive principles involved, the same being applicable to devices and systems having different structural characteristics and arrangements, all within the purview of the present invention.

What is claimed is:

1. In a fluid pressure operable fuel pump, a casing, a piston movable in the casing and dividing the interior thereof into an actuating chamber and a pumping chamber, valved inlet and outlet passages in the pumping chamber for connection to a fuel reservoir and engine respectively, valved passages in said actuating chamber connectible to atmospheres of different pressures, valves for alternately closing and opening said last mentioned passages, a rock member connected to the valves and pivoted to the casing, a spring connected to the movable end of the rock member, the other end of the spring being anchored to said casing, and means providing a play connection between the piston and a portion of the spring intermediate of its ends.

2. In a fluid pressure operable fuel pump, a casing having a piston movable therein, a removable closure section for the casing, valve means for effecting the alternate admission of different fluid pressures against one face of the piston, said valve means being carried by the removable section and including a valve actuating member movable in the plane of movement of the piston, and a detachable connection between the piston and said valve actuating member whereby said removable section and the valve means carried thereby may be removed as a unit without disturbing the piston and casing.

3. In a fluid pressure operable fuel pump, a casing having a piston movable therein, a removable closure section for the casing, valve means for effecting the alternate admission of different fluid pressures against one face of the piston, said valve means being carried by the removable section and including a valve actuating member movable in the plane of movement of the piston, a member carried by the piston, and a detachable connection between said members, said connection comprising a finger extending substantially transverse of the axis of movement of the piston from one of said members and engaged in an aperture in the other of said members.

4. In a fluid pressure operable fuel pump, a casing including a pair of sections, a flexible diaphragm between said sections, a member carried by the diaphragm, valve mechanism for effecting the alternate admission of different fluid pressures against one face of the diaphragm, said mechanism being supported by one of said sections and including a valve actuating member slidably supported for movement in the direction of movement of said diaphragm, one of said members having an aperture, and the other of said members having a finger extending in substantial parallellism with the normal plane of the diaphragm, said finger extending through said aperture.

5. In a fuel pump, a casing, a flexible diaphragm supported at its periphery by the casing, a pair of discs secured together and to the diaphragm at the central portion of the latter, one of said discs having a keyhole slot therein, and a rod having a recessed end portion detachably engaged in the keyhole slot.

6. In a fluid pressure operable fuel pump, a casing having a piston movable therein, said casing including a removable section, valve means for effecting the alternate admission of different fluid pressures against one face of the piston, said valve means being carried by the removable section and including an element supported by the removable section and movable relative thereto in the direction of movement of the piston, a valve moving member carried by the removable section, a spring for controlling the movement of said valve moving member and having one end connected to said member and the opposite end anchored to said removable casing section, said element being engaged with a portion of the spring intermediate of its ends and with the piston for providing a connection between the medial portion of the spring and the piston.

7. In a fluid pressure operable fuel pump, a central casing section having a central wall, and an end section removably secured to each end of the central casing section, a diaphragm between each two adjacent sections whereby inner fluid chambers are provided between said diaphragms and the central wall and outer fluid chambers are provided between said diaphragms and the end casing sections, valve means for effecting the alternate admission of different fluid pressures to said outer fluid chambers, said valve means being in one of said end casing sections detachably connected for operation to and by the adjacent diaphragm, and fluid passages controlled by said valve means for controlling the movement of fluid through said chambers, said passages comprising registering openings formed in the walls of said sections to provide continuous passages through the casing when the sections are assembled.

8. In a fluid pressure operable fuel pump, a central casing section having a central wall, and an end section removably secured to each end of the central casing section, a diaphragm between each two adjacent sections whereby inner fluid chambers are provided between said diaphragms and the central wall and outer fluid chambers are provided between said diaphragms and the end casing sections, valve means for effecting the alternate admission of differential fluid pressures to said outer fluid chambers, said valve means being in one of said end casing sections detachably connected for operation to and by the adjacent diaphragm, fluid passages controlled by said valve means for controlling the movement of fluid through said chambers, said passages comprising registering openings formed in the walls of said sections to provide continuous passages through the casing when the sections are assembled, and sleeves fitted in the registering openings between the adjacent sections.

9. In a fuel pump, a central casing section having a central wall and an end section removably secured to each end of the central casing section, a piston at each side of the central wall, a rod slidably supported by said central wall and connected to central portions of the pistons, the foregoing structure providing a pair of inner chambers adjacent said central wall and a chamber between one piston and an end section, means for reciprocating the piston and rod assembly, a fluid passage in said central casing section common to both of said central chambers, valves for controlling the passage of fluid between said chambers and said fluid passage, and means removably secured to outer portions of the central casing section for confining said valves, whereby said valves may be assembled in or removed from said central casing section without disturbing said end sections or pistons.

10. In a fluid pressure operable fuel pump, a hollow casing, a piston dividing the casing interior into a fluid pressure chamber and a fuel pumping chamber, valve means in said fluid pressure chamber actuated by said piston for intermittently admitting less-than-atmospheric pressure to said pressure chamber for urging said piston in one direction, means for effecting return movement of the piston, a fluid passage in said casing connectible to a source of less-than-atmospheric pressure, a recess in said casing, a tubular portion extending from the casing centrally of said recess, said fluid passage terminating in the interior of said tubular portion, a second fluid passage in said casing providing communication between the valve means and said recess, a removable closure plate having an atmospheric vent secured to the casing over said recess, a flexible diaphragm between said closure plate and recess and adapted to seat against said tubular portion, and resilient means for urging said diaphragm away from said tubular portion, whereby the existence of a predetermined degree of suction in said fluid passages and recess will allow atmospheric pressure effective through said air vent to flex the diaphragm toward said tubular portion against the urge of said resilient means, to restrict the flow of fluid through said passages.

11. In a suction operated fuel pump, having a casing and a fluid exhaust passage therein extending from the motor chamber thereof, said casing having a recess in the outer surface thereof into which said exhaust passage opens, a second fluid exhaust passage in the casing having one end connectible to a source of suction, the other end of said second passage terminating in a tubular extension into said recess, and a flexible diaphragm secured to the casing over said recess and adapted when flexed to seat against said tubular extension, whereby a predetermined degree of suction maintaining within said fluid passages will cause said diaphragm to be flexed to thereby restrict the passage of fluid through said passages.

12. In a fluid pressure operable fuel pump, a hollow casing, a piston dividing the casing interior into a fluid pressure chamber and a fuel pumping chamber, valve means in said fluid pressure chamber actuated by said piston for intermittently admitting operating pressure to said pressure chamber for urging said piston in one direction, means for effecting return movement of the piston, a fluid passage in said casing connectible to a source of operating pressure, a recess in said casing, said fluid passage terminating in a valve seat in the casing recess, a second fluid passage in said casing providing communication between the valve means and said recess, a removable closure member secured to the casing over said recess, flexible diaphragm means between the closure plate and recess and having a valving part adapted to engage said valve seat, and resilient means for urging said diaphragm means away from said valve seat, whereby the existence of a predetermined degree of suction in said fluid passages and recess will move the valving part toward the valve seat against the urge of said resilient means, to restrict the flow of fluid through said passages.

13. In a fluid pressure operable fuel pump, a hollow casing, a piston dividing the casing interior into a fluid pressure chamber and a fuel pumping chamber, valve means in said fluid pressure chamber actuated by said piston for intermittently admitting operating pressure to said pressure chamber for urging said piston in one direction, means for effecting return movement of the piston, a fluid passage connectible to a source of operating pressure and opening into a recess, a second fluid passage in said casing providing communication between the valve means and said recess, and pressure responsive means having a valving part operating in the recess to restrict the flow of fluid through said passages, said valving part being normally urged to a non-valving position.

14. In a fluid pressure operable fuel pump, a hollow casing, a piston dividing the casing interior into a fluid pressure chamber and a fuel pumping chamber, valve means actuated by said piston for intermittently admitting less-than-atmospheric pressure to said pressure chamber for urging said piston in one direction, means for effecting return movement of the piston, a fluid passage connectible to a source less-than-atmospheric pressure, a recess in said casing, a tubular portion extending from the casing into said recess, said fluid passage terminating in the interior of said tubular portion, a second fluid passage in said casing providing communication between the valve means and said recess, a removable closure plate for the recess, pressure responsive means adapted to seat against said tubular portion to restrict the flow of fluid through said passages, and resilient means for urging said pressure responsive means away from said tubular portion, whereby the existence of a predetermined degree of suction in said fluid passages and recess will move the pressure responsive means toward said tubular portion against the urge of said resilient means.

15. A suction operable fuel pump having a motor chamber, and piston means operating back and forth therein under fluid pressure differential in both directions of movement, a suction line leading to the motor chamber by which suction may be utilized to actuate the pump, valve mechanism for operatively connecting the suction line and the outside atmosphere to the motor chamber to provide the required fluid pressure differential first in one direction and then in the reverse direction to effect operation of said piston means and the pump, and pressure responsive means in said suction line for restricting the passage of fluid through said suction line to a substantially predetermined degree, whereby the differential pressure action on the piston means to operate the fuel pump is determined against becoming excessive and the pressure of fuel at the pump outlet is maintained below a predetermined maximum.

16. In a fluid pressure operable fuel pump, a hollow casing, piston means dividing the casing interior into fluid pressure chambers and fuel pumping chambers, valve means actuated by said piston means for intermittently admitting operating pressure to said pressure chambers for urging said piston means first in one direction and then in the opposite direction as the pressure differential is applied first in one direction and then in the reverse direction, a fluid passage leading to said valve means and connectible to the source of operating pressure, and means responsive to the operating fluid pressure being supplied for determining its influence on said piston means whereby the power of said piston means will be determined and the pressure on the fuel at the pump outlet will be maintained below a predetermined maximum.

17. A suction operable fuel pump having a motor chamber, and piston means operating back and forth therein, a suction line leading to the motor chamber by which suction may be utilized to actuate the pump, valve mechanism for operatively connecting the suction line and the outside atmosphere to the motor chamber to provide the required fluid pressure differential in one direction to effect operation of said piston means and the pump on the liquid expelling stroke of the latter, means for effecting return movement of said piston means, and pressure responsive means in said suction line for restricting the passage of fluid through said suction line to a substantially predetermined degree, whereby the differential pressure action on the piston means to operate the fuel pump is determined against becoming excessive and the pressure of fuel at the pump outlet is maintained below a predetermined maximum.

HENRY HUEBER.
ERWIN C. HORTON.